Dec. 17, 1946.  J. B. MALIN ET AL  2,412,821
INTERNAL-COMBUSTION ENGINE
Filed March 4, 1944  3 Sheets-Sheet 1

JAY B. MALIN
WILLIAM N. PENNEY
INVENTORS

BY
THEIR ATTORNEYS

Dec. 17, 1946.  J. B. MALIN ET AL  2,412,821
INTERNAL-COMBUSTION ENGINE
Filed March 4, 1944   3 Sheets-Sheet 2
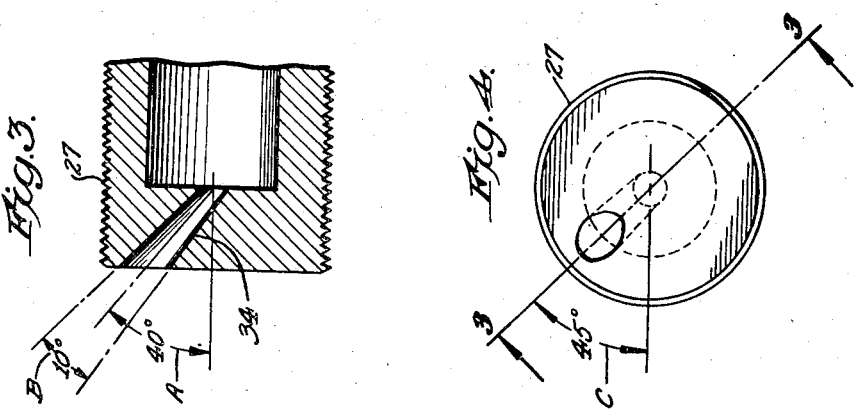
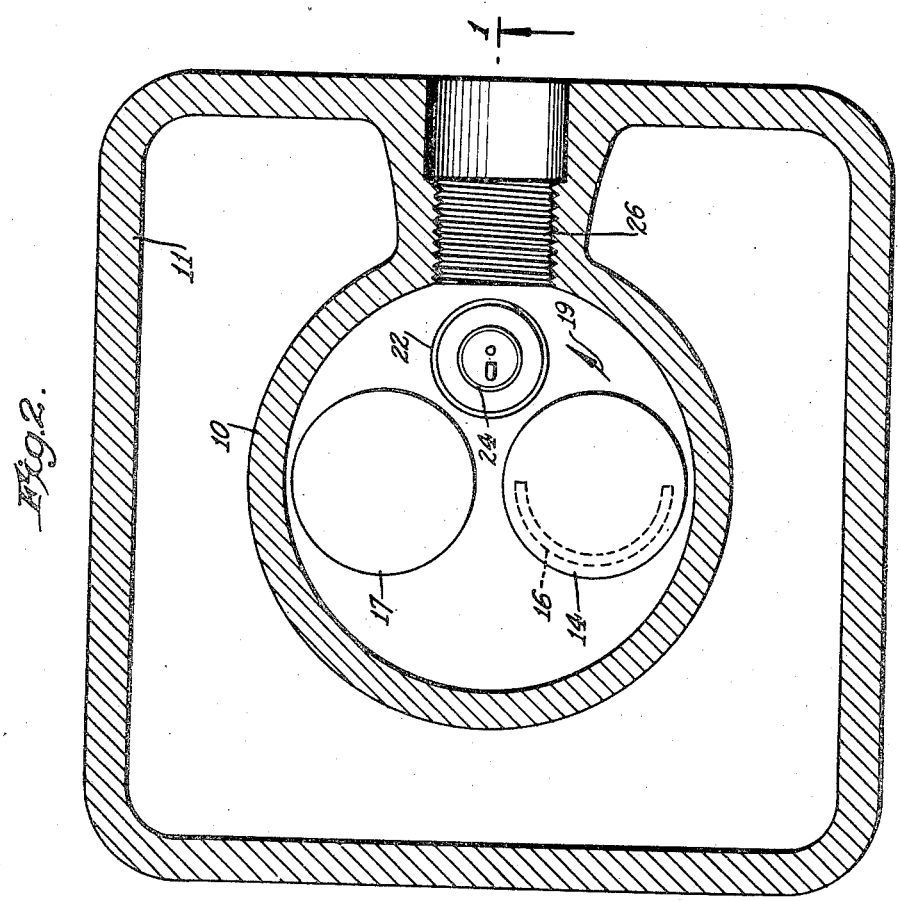

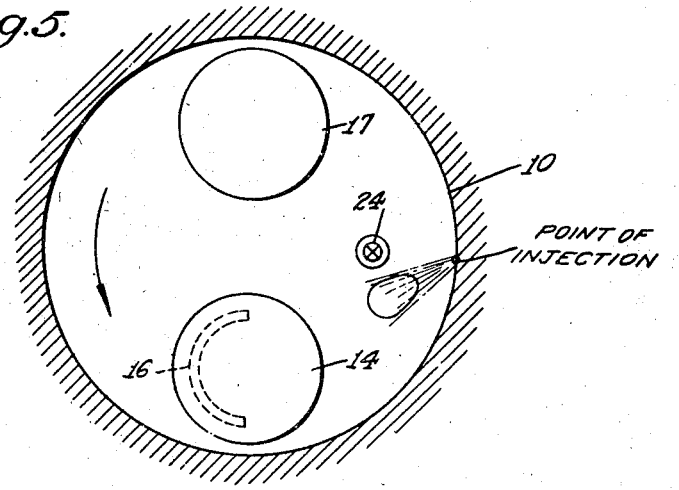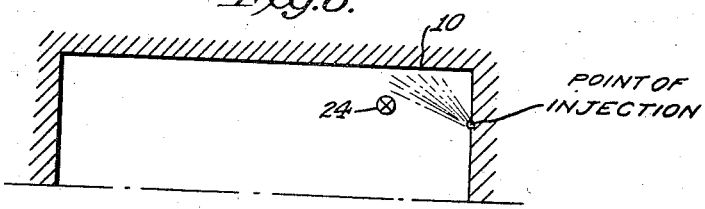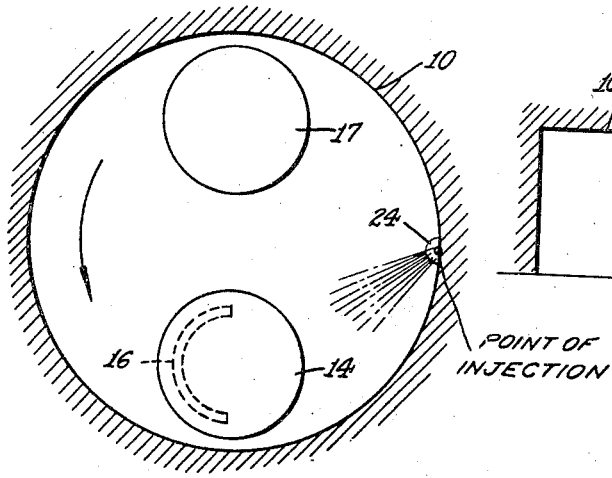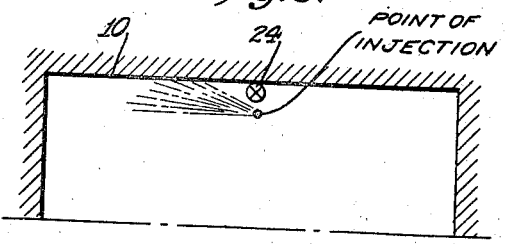

Patented Dec. 17, 1946

2,412,821

UNITED STATES PATENT OFFICE 2,412,821

INTERNAL-COMBUSTION ENGINE

Jay B. Malin, Fishkill, and William N. Fenney, New York, N. Y., assignors, by mesne assignments, to The Texas Company, New York, N. Y., a corporation of Delaware Application March 4, 1944, Serial No. 525,006

3 Claims. (Cl. 123—32)

This invention relates to an internal combustion engine and to a method of operating such an engine.

The present invention relates to a modification of the internal combustion engine, and method of operating that engine, wherein combustion is independent of the spontaneous ignition quality of the fuel employed, as generically disclosed and claimed in the copending application of Everett M. Barber, Serial No. 513,232, filed December 7, 1943. The present modification is distinguished from the embodiments of the generic invention which are specifically claimed in said application Serial No. 513,232 by the injection of fuel in a direction counter to the direction of air swirl within the cylinder combustion space, and by a critical relationship of injection advance to ignition advance and a critical positioning of the fuel nozzle and jet with respect to the ignition device.

In accordance with the generic invention of said application Serial No. 513,232, air unmixed with fuel, or air containing insufficient fuel to support combustion, is introduced into the disc-shaped combustion space of the engine cylinder and compressed on the compression stroke, fuel is injected into said compressed air during the latter part of the compression stroke under conditions such that at least a part rapidly vaporizes and forms combustible fuel vapor-air mixture with only a short travel from the point of injection, this combustible mixture formed from the first increment of injected fuel is spark ignited substantially as soon as formed and before sufficient fuel has been injected to disseminate widely within the combustion space, whereby only a localized patch of combustible mixture exists within the combustion space at the time of ignition and the establishment of a flame front, and then the injection of fuel is continued during the balance of the injection period into a narrow zone or zones of the combustion chamber immediately in advance of the flame front, whereby additional quantities of combustible fuel vapor-air mixture are progressively formed, ignited by the flame and burned substantially as rapidly as produced. The net result is that any combustible fuel vapor-air mixture undergoing combustion within the cylinder is so rapidly consumed after formation that it is cushioned by a mass of incombustible gas, including air, products of combustion and incombustibly rich mixture. Consequently, there is eliminated the formation of highly compressed and heated end gases consisting of combustible fuel vapor-air mixture which can undergo spontaneous ignition, and knocking of the engine is not possible.

In carrying out said invention, the compressed air within said combustion space and the locus of fuel injection are moved relatively to each other in an orderly manner throughout the period of fuel injection to thereby impregnate the localized portions of air at a predetermined fuel-air ratio. In one embodiment specifically claimed in said application, the air is introduced into the combustion space in a manner to produce a high velocity induction air swirl within the disc-shaped combustion space, which air swirl is maintained during compression and the period of injection, and the fuel is injected from a point located in the cylinder wall generally tangentially of the combustion space and in the direction of air swirl, with spark ignition occurring at a point close to the nozzle tip and adjacent the cylinder wall at the side of the fuel spray. The present invention involves a modification of this form employing high velocity induction air swirl.

In accordance with the present invention, the fuel is injected in a jet extending along a chord of the combustion space moving across the swirling air from a point adjacent the periphery of the combustion space and counter to the direction of air swirl. A spark of ignitible intensity is provided in the combustion space about 15–32 crank angle degrees after the beginning of fuel injection, said spark being positioned slightly on the air down-stream side of said fuel jet to ignite the combustible fuel vapor-air mixture formed from the first increment of injected fuel substantially as soon as the swirling air has blown or diverted the same into contact with the point of ignition.

It is important that the location and design of the means for injecting fuel be such that the fuel may be injected into the combustion chamber in a direction against the air swirl and on the air upstream side of the ignition means adjacent to but not impinging on such means. Also, the injection should be in a direction such that the swirling air tends to blow the injected fuel, or rather a resulting mixture of fuel and air, in contact with the ignition means. In other words, the fuel should be injected so that it enters the planes in which the air is swirling that pass through the ignition means.

Accordingly, where a disc-shaped combustion chamber is provided and the ignition means is disposed in the cylinder head, the fuel may be injected from the side of the cylinder in a direction which is toward the air upstream side of the ignition means and also is directed upwardly toward the cylinder head. In this way the fuel is placed in a position to be blown in the direction of the ignition means.

As distinguished from the specific embodiment disclosed and claimed in said application Serial No. 513,232, wherein the direction and intensity of the fuel jet introduced in the direction of air swirl is sufficient to carry that jet substantially to the point of ignition in about 4–10 crank angle degrees after the start of injection, the present invention operates on the principle of utilizing the swirling air to pick up and divert vaporized fuel from the edges of the jet, and carry the resulting combustible fuel vapor-air mixture to the point of ignition. While a close positioning of the point of ignition with respect to the point of injection is of critical importance, the relationship of the jet itself to the point of ignition is quite different from the previous embodiment and the time at which a spark of ignitible intensity must be present after the start of injection is longer and less critical than in said previous embodiment. In one specific application of the present invention, the jet is directed along a chord of the combustion space counter to the direction of air swirl, so that the center line of the jet makes an angle of about 30° with the radius of the combustion space passing through the point of injection when viewed in a horizontal plane, and the point of ignition is located substantially on said radius less than half way from the point of injection to the center of the combustion space. In another specific embodiment, wherein the fuel is injected along a chord of the combustion space in substantially the same angular relationship and also at an upwardly inclined angle toward the cylinder head, the point of ignition is located adjacent the cylinder wall substantially directly above the point of fuel injection.

It is pointed out that, in adapting conventional engines to the present method of operation with non-knocking combustion, difficulties sometimes arise in providing space in the cylinder wall for the mounting of the fuel injection nozzle and the spark plug in proper relationship to secure satisfactory operation with the fuel injected generally tangentially of the combustion space in the direction of air swirl. Also, in some cases, it is desirable to avoid the critically short relationship between the time of the beginning of fuel injection and the time of spark ignition required with that embodiment. It is accordingly seen to be an object of the present invention to overcome these difficulties and to provide satisfactory engine constructions, and methods of operating such engines, wherein the fuel may be injected in a direction counter to the direction of air swirl.

From the foregoing discussion, it will be understood that, provided the conditions described above are maintained, the specific arrangement of mechanical elements required to create these conditions may be varied. However, in order that the invention may be understood more fully, there will be described, in connection with the accompanying drawings, forms of modified engines in which operation with a low octane fuel at high compression ratios and without knock has been accomplished. In the drawings:

Figure 2 is a sectional view on the line 2—2 of Figure 1, looking up at the top of the engine cylinder; however, with the injection mechanism removed;

Figure 3 is an enlarged, detailed sectional view of the inner end of an adapter employed in connection with the injection mechanism, the section being taken through the middle of the opening in the adapter; i. e., on line 3—3 of Figure 4;

Figure 4 is a diagrammatic illustration of the manner in which the adapter is placed in the side of the cylinder wall;

Figure 5 is a diagrammatic view looking up at the engine cylinder shown in the preceding figures, illustrating the conditions of air swirl and fuel injection within the combustion chamber;

Figure 6 is a diagrammatic side view of this cylinder, further illustrating the conditions within the cylinder;

Figure 7 is a diagrammatic sectional view looking towards the head of another engine cylinder in which the point of injection and spark plug occupy different relative positions; and, Figure 8 is a diagrammatic sectional view of the engine cylinder shown in Figure 7, the view being a vertical section through the cylinder looking in the direction of the point of injection and spark plug.

Figure 1:
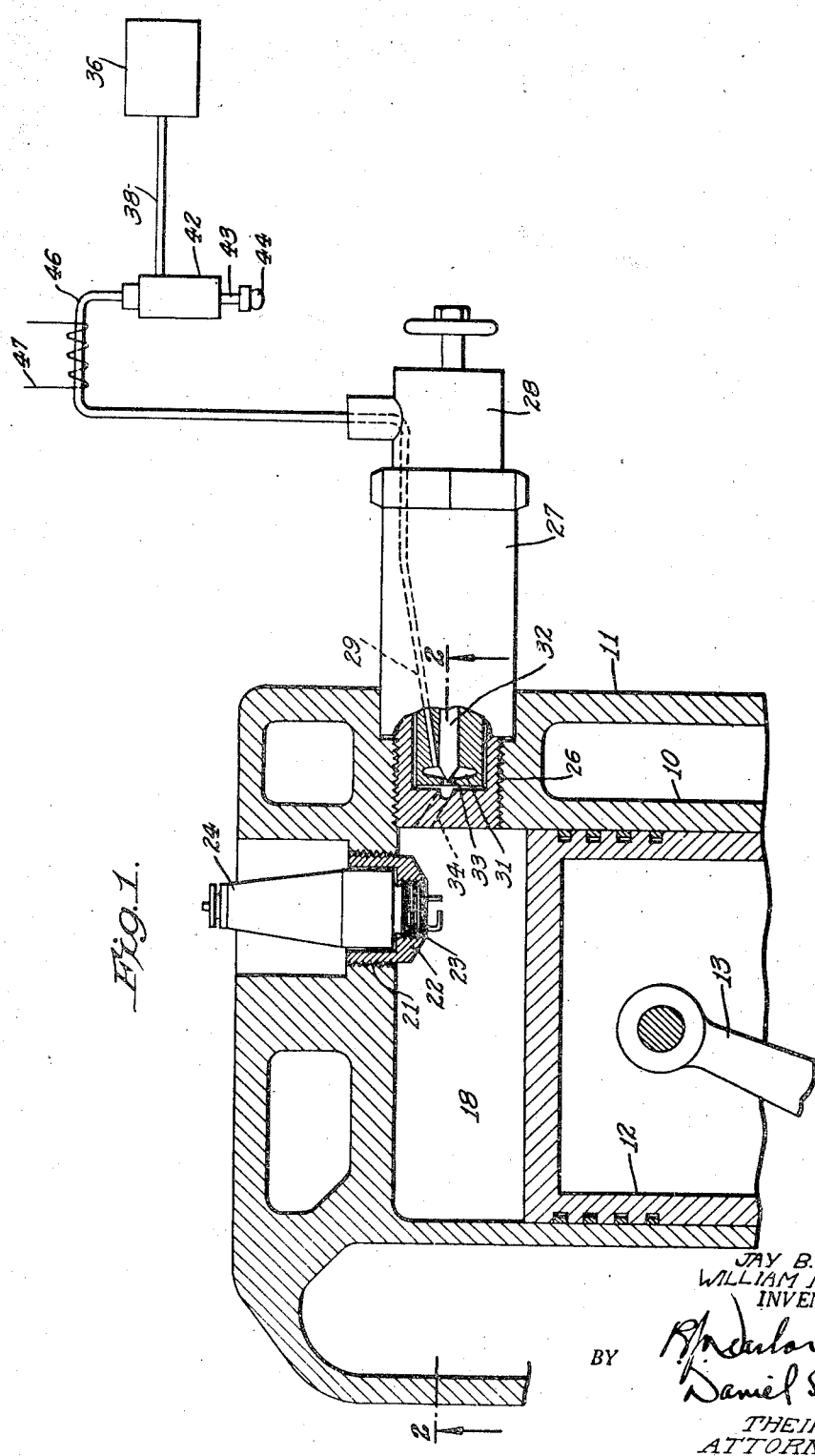
Figure 1 is a view partly in section on the line 1—1 of Figure 2 of the cylinder of an engine equipped in accordance with the present invention. In this figure, the fuel system employed and the injector are more or less diagrammatically illustrated.

Referring to Figures 1 and 2, the engine cylinder is shown at 10, having the usual water jacket 11. Disposed in the cylinder is a piston 12 having a connecting rod 13 which runs to the usual crank shaft, not shown. The cylinder head is equipped with an intake port controlled by a poppet intake valve 14. This port communicates with a conventional air-intake pipe or manifold (not shown). As shown in Figure 2, the valve 14 is provided with a shroud 16 which covers 180 degrees of the valve opening.

It will be seen that when this valve is opened, the direction of air flow through the valve is tangential to a circle having its center at the axis of the cylinder, which is effective to impart a swirling movement of high velocity to the air introduced into the combustion space in the direction of the arrow 19. The cylinder is also equipped with an exhaust port which is controlled by a poppet valve 17. The port controlled by this valve leads to a conventional exhaust valve pipe or manifold (not shown). It will be understood that the valves 14 and 17 may be actuated in the customary manner by suitable cams carried by a conventional valve cam shaft.

As shown, a disc-shaped combustion space 18 is formed by the head and wall of the engine cylinder and the head of the piston. While the piston and cylinder head are shown in Figure 1 as being flat, either or both may be dished or crowned, as discussed above. Thus, it is to be understood that the term "disc-shaped" is used in a broad sense as meaning a combustion space which is generally circular in cross section, but which may have various configurations in vertical section due to dishing or crowning of the cylinder head or piston.

The cylinder head is provided with an opening 21 in which is disposed a threaded reducing member 22, having an opening 23 for receiving a spark plug 24. It will be noted that by this arrangement, the electrodes of the spark plug extend somewhat into the combustion space. The cylinder is also provided in its side with a threaded radial bore 26, the center of which is in line with the center of spark plug 24. As shown in Figure 1, there is disposed an adapter 27 in threaded engagement with bore 26. The adapter accomplishes two functions: It encloses and supports an injector 28 and provides means for breaking up and directing the spray from the injector nozzle. The injector 28 is of the conventional type in which the orifice opening is normally held closed by means of a spring-pressed nozzle pintle. The fuel under high pressure is introduced through a suitable conduit 29 into a chamber surrounding the conical end of the nozzle pintle. When the pressure on the fuel is sufficiently high, the nozzle pintle is raised and fuel issues in spray form from the opening. Since injectors of this type are well-known in the art, in Figure 1 only the inner end of the injector is shown in detail. Thus, the fuel enters through the conduit 29, flows into a fuel chamber 31 at a pressure sufficiently high to raise a nozzle pintle 32 and permit the flow of the fuel through orifice opening 33.

The inner end of the adapter 27 utilized in this embodiment of the invention will be described more in detail. It is provided with an opening 34 which leads from the orifice opening of the injector to the interior of the cylinder. Referring particularly to Figure 3, it will be seen that the angle of the opening in the plane on which this figure is drawn with the axis of the adapter is the angle A, which in this case is 40 degrees. Also, it will be seen that the angle formed between the sides of the opening is angle B, which in this case is 10 degrees. As shown in Figure 4, and also, to some extent, in Figure 1, the adapter opening is arranged, when in place, so that the center line of the opening forms an angle C (which in this case is 45 degrees) with the horizontal. Accordingly, the adapter directs the fuel spray upwardly and to the right in Figure 1 (downwardly and at an angle in Figure 2). This may also be seen by reference to Figures 5 and 6, in which the direction of the spray is perhaps shown more clearly. In these two figures, the spray is shown as it would appear under normal atmospheric conditions and in the absence of air swirl. Fuel injection mechanism including an adapter, and the adapter per se, are disclosed and claimed in the copending application of Jay B. Malin, Serial No. 515,234, filed December 22, 1943. While not specifically illustrated in the drawings, it will be seen that the center line of the adapter opening forms, in a horizontal plane containing the center line of the injector, a projected angle of about 30 degrees with the center line of the injector. Thus, the fuel spray is directed about 30 degrees from the radial direction towards the air upstream side of the combustion space. Undoubtedly, under actual conditions of operation where higher pressures and temperatures prevail and the effect of air swirl is felt, the actual spray form is somewhat different from that shown. As shown in Figures 5 and 6, the spray is such that under non-operating conditions, the spray impinges upon the cylinder head over an area on the air upstream side of the spark plug.

Referring again to Figure 1, the operation of the engine illustrated will be described more in detail.

On the suction stroke of the engine, air is introduced through intake valve 14 and is caused to swirl by means of the shroud 16, as previously described. At a selected point near the top of piston travel, the injection of the fuel into the swirling air is begun. The fuel system diagrammatically illustrated in Figure 1 includes a fuel storage vessel 36 from which the fuel is pumped through line 38 to a pump 42. The pump shown is a conventional port-controlled plunger pump which is provided with an intake port, fuel chamber, by-pass port, check valve, and a plunger provided with a scroll or helix on its surface, whereby the amount of fuel can be controlled by rotation of the plunger. Pumps of this type are well-known in the art and are described, for example, at pages 74 and 274 of the Diesel Engine Catalog, Diesel Engine, Inc., New York, 1941, volume six. A port-controlled plunger pump permits variation in the amount of fuel injected so as to accomplish full or part load operation. Also, the pump effects sharp termination of the feed of fuel under pressure sufficient to operate the fuel injector. As shown in Figure 1, the pump plunger 43 is operated by a suitable cam 44 which may be interconnected with the crank shaft of the engine in conventional manner. The fuel under a high pressure which may be of the order of 500 to 4,000 pounds per square inch is forced through line 46 leading into conduit 29 in injector 28, as previously described. The fuel in flowing through line 46 may be heated if desired, and there is shown for this purpose a heating coil 47. The fuel supplied under the high pressure during the period of injection flows into fuel chamber 31 and the force resulting from the pressure on the fuel lifts nozzle pintle 42 and permits a jet of fuel to pass through orifice 33. The fuel enters opening 34 in the inner end of adapter 27, is broken up into a fine spray and injected into the swirling air, as described.

The first increments of injected fuel form a combustible mixture with the swirling air, and this mixture is blown into contact with the electrodes of spark plug 24. At this time or shortly thereafter, a spark of igniting intensity is passed between the electrodes of spark plug 24 and the combustible mixture is ignited. During the remainder of the period of injection, the remainder of the fuel is injected into the swirling air and is promptly burned in the existing flame front. It will be noted that the fuel is injected into the swirling air before the flame front, which tends to advance towards the point of injection. It is probable, however, due to the swirling air, that the flame front remains substantially stationary in relation to the cylinder walls.

Another arrangement which has been found to give knock-free operation even at high compression ratios and charge densities is shown in Figures 7 and 8. As shown in these figures the spark plug is disposed in the cylinder wall at the edge of the combustion space and the point of injection (injection nozzle) is located just below the plug. The fuel is injected against the direction of air swirl on the air up-stream side of the plug and the combustible mixtures formed between the fuel and the air are blown into contact with the electrodes of the spark plug. It will be noted that the fuel spray is at least partly directed towards the top of the cylinder, and this is preferred practice.

It will be understood that in order to accomplish effective operation of the engine, the several factors affecting such operation should be coordinated. Considering first the locations of the point of injection and the spark plug, these should be selected so that sufficient admixture of fuel with the swirling air is permitted prior to the time when any considerable amount of fuel reaches the spark plug, but not so far away from the zone of injection as to permit extensive dissemination of fuel throughout the combustion space before ignition. While the particular arrangements shown in the drawings have been found to be satisfactory, in cases where other mechanical arrangements are possible without interfering with valve operation, the spark plug may be displaced somewhat from the positions shown. It should also be pointed out at this time that the arrangements shown were employed in a cylinder having a bore diameter of 3¼ inches, and in utilizing a cylinder with a larger bore, greater variation in the position of the spark plug would be possible. It is to be understood that the spray pattern, fuel intensity of the jet and velocity of the swirling air are altered and correlated for the different spacings of the spark plug and point of injection, in order to obtain the desired knock-free operation.

The point in the compression stroke at which the injection of fuel is begun may be varied; for example, it may be as much as 75 degrees before top dead center, and for maximum power, if substantially all of the air within the combustion space is to be consumed, it may be about 50 to 40 degrees before this point. Where the power required is less, the beginning of fuel injection may be at or shortly after top dead center, or, for the smaller power requirements, the injection may still be initiated prior to top dead center and may be cut off so that only that portion of air is consumed which is necessary to supply the power required. In general, it may be stated that the injection of fuel should preferably be started substantially before top dead center, for example, 75 to 30 degrees before this point, and should preferably be ended before or slightly after top dead center.

The amount of fuel that may be injected in a cycle is, of course, dependent upon the weight of air available for admixture therewith to form combustible mixtures. The weight of air available, in turn, is dependent upon the temperature and pressure at which the air is introduced into the engine cylinder. For example, under boost pressures, more air will be available than when the air is introduced at atmospheric pressure. Also, the amount of fuel that may be injected and burned effectively is dependent upon the air available in the zone of injection or impregnation, and this is affected by the velocity of air swirl. Normally, the rate of fuel injection should be such as to give a fuel-air ratio in the impregnated zone of around 0.06 for light and intermediate loads up to the point where substantially all of the air within the combustion space is consumed. To further increase the power produced on each cycle for maximum loads, the fuel rate may be increased for a given velocity of swirling air so as to uniformly impregnate that air at a fuel-air ratio up to about 0.08 or above. It will thus be seen that the duration of injection and rate of injection are dependent factors which themselves are dependent upon the fuel-air ratio in the impregnated zone and the overall fuel-air ratio desired. While in view of these facts no definite duration for injection may be set, it may be stated in general that where the overall fuel-air ratio varies from 0.06 to 0.08 and the beginning of injection varies from 60° to 40° B. T. C., the duration may be of the order of 35 to 80 crank angle degrees.

As previously indicated, a high velocity of swirl should be imparted to the air introduced into the combustion space. The invention is not limited to any particular means of causing this swirl and such means are well-known in the art; however, the use of a shrouded intake valve has been found to be satisfactory in an engine of the type shown in the drawings. While a 180 degree shroud is shown, it is believed that shrouds covering more or less of the valve opening would produce the desired swirl. The rate of swirl should be such as to produce about six revolutions or more of the air for each engine revolution. It is preferred also to control the duration of injection so that the injection of fuel takes place during one revolution of air, since in this way the air is uniformly impregnated with fuel.

An important feature of the present invention is the proper synchronization of the spark advance with the injection advance to secure ignition of the first increment of injected fuel substantially as soon as that fuel has mixed with the air to form a combustible fuel vapor-air mixture, and that mixture has been blown into contact with the electrodes of the spark plug. Proper synchronization requires that a spark of igniting intensity be available at the time this first-formed portion of the combustible fuel vapor-air mixture reaches the spark plug, or very shortly thereafter.

While the present invention can be operated with a substantially instantaneous spark at the plug electrodes, this requires a critical coordination of the spark advance with the injection advance. For example, in the construction shown in Figures 1 to 6, work done using ignition systems producing sparks of appreciable duration showed that knock-free operation was possible, provided a spark of igniting intensity was present within about 15 to 32 degrees after the start of injection. If the spark occurs too soon and is not maintained, by the time a combustible fuel-air mixture is formed there is present no means for igniting the mixture and missing occurs. On the other hand, when the spark occurs too late, opportunity is afforded for the dissemination of fuel widely throughout the combustion space, making possible the formation of a combustible end gas and permitting knock.

Although where a short or instantaneous spark is employed, careful coordination between injection advance and spark advance is necessary, it has been found that the conventional magneto or coil ignition systems have a spark duration of about 5 to 30 crank angle degrees at an engine speed of 1800 R. P. M. For example, in the construction shown in Figures 1 to 6, and employing an ignition circuit of the magneto type having a spark duration of about 7 crank angle degrees with a plug gap of 0.040 inch and increasing to a spark duration of about 28 crank angle degrees with a plug gap 0.010 inch, the engine operated satisfactorily with the following setting of spark advance, using a 60° injection advance and an injection period of about 36° throughout the runs. The runs were carried out with an overall fuel-air ratio of about 0.1. With a spark duration of 7 degrees, satisfactory operation occurred with an ignition advance of about 33 to 28° B. T. C.; and with a spark duration of 28 degrees, satisfactory operation occurred with an ignition advance of about 45 to 28° B. T. C.

It will be obvious that the foregoing discussion is presented primarily for the purpose of disclosing ways in which the operation of the engine may be varied, and is not intended to indicate that only the magneto type of ignition system is suitable or that the factors considered would be varied in an actual operating engine. For example, conventional ignition circuits of the coil and breaker type may be used. It may be pointed out here that experience has indicated that a relatively high current spark is preferable. Also, a continuous spark of longer duration, for example, a spark such as is used in fuel burner systems, may be employed and may be left on during the entire period of injection or may be cut off after being on for a selected portion of the injection period. Where "spark ignition" and similar expressions appear in the description and claims, it is to be understood that these expressions include the above types or similar types of ignition systems for igniting the fuel-air mixture.

As pointed out above, the fuel jet is preferably directed towards the cylinder head at a rate which is believed to cause the fuel to impinge on the inner surface of the cylinder head. It is believed that the fuel which so impinges may remain on the surface for a time, and that this fuel is vaporized and/or mixed with swirling air at a relatively slow rate, thus permitting injection of a substantial amount of fuel before ignition and yet avoiding dissemination of the fuel widely in the combustion space.

The engine of the present invention may be operated on a cycle which approximates the theoretical Otto cycle, a cycle which approximates the theoretical Diesel cycle, or a cycle which is more or less midway between the two. In a given engine, the cycle employed is primarily dependent upon the fuel injection rate and the point where injection is begun. In view of the inherently higher cycle efficiency of the Otto cycle, as compared to the Diesel cycle at the same compression ratios, it is generally preferred to operate the engine of the present invention on a cycle approaching the theoretical Otto cycle; i. e., a cycle approaching combustion at constant volume.

Inasmuch as the limitations with respect to knock are eliminated in the present invention, it is preferred to operate the engine at a high compression ratio. Thus, it is generally preferred to operate the engine on the Otto cycle at a compression ratio of about 9:1 to 10:1 to obtain the inherent increase in the cycle efficiency resulting from the higher compression ratio, while, at the same time, avoiding the necessary increase in cost, size, and weight of the engine that is involved in Diesel engine construction for operation at compression ratios at about 14:1 to 16:1.

While the invention has been described above as applied to four-cycle operation, it is to be understood that the invention is also applicable to two-cycle operation; in fact, the invention lends itself particularly well to two-cycle operation because there is no necessity for preforming the fuel mixture, and this enables the suction stroke of four-cycle operation to be easily eliminated.

As previously discussed, a principal advantage of the engine of the invention results from the fact that satisfactory operation at high compression ratios and charge densities and with low octane fuels may be obtained. Thus, the invention includes the use of various normally liquid and normally gaseous fuels of both low and high octane values. As examples of suitable fuels, there may be mentioned gasoline of low or high octane value, kerosene, Diesel fuels, methyl alcohol, light lubricating oils, butane, etc. It is important, however, that the fuel boil over such a range that at least a portion of the fuel is vaporized in the combustion space under the conditions existing therein at the time of injection. By preheating the fuel, liquid fuels boiling over an elevated range may be used.

Obviously many modifications and variations of the invention, as hereinbefore set forth, may be made without departing from the spirit and scope thereof, and therefore only such limitations should be imposed as are indicated in the appended claims.

We claim:

1. In a spark-ignition fuel-injection internal combustion engine of the character described having a cylinder with a cylinder head, a piston reciprocatingly mounted therein, said parts forming a disc-shaped combustion space, means for producing high velocity induction air swirl within said combustion space, means for injecting fuel into the swirling air toward the latter part of the compression stroke of the piston, means for spark igniting the first increment of injected fuel substantially as soon as combustible fuel vapor-air mixture is formed therefrom to establish a traveling flame front, and means for controlling the rate and duration of fuel injection after ignition to successively form additional quantities of combustible fuel vapor-air mixture immediately in advance of the traveling flame front and which are ignited by the flame and burned substantially as rapidly as formed. The modification wherein the fuel injection means comprises a nozzle positioned in the cylinder wall and constructed to direct a fuel jet from a locus of fuel injection at the periphery across a chord of the combustion space counter to the direction of air swirl and upwardly inclined toward the cylinder head, and the spark ignition means comprises a spark plug having electrodes positioned within the combustion space at a point above the horizontal plane of the locus of fuel injection and slightly on the air down-stream side of the fuel jet, said point of spark ignition and said locus of fuel injection lying in a vertical plane containing a radius of said combustion space.

2. An internal combustion engine according to claim 1 wherein the spark plug electrodes are located adjacent the cylinder wall substantially directly above the locus of fuel injection.

3. An internal combustion engine according to claim 1, wherein the fuel injection is constructed to direct the jet so that the center line of the jet makes an angle of about 30° with the radius of the combustion space passing through the point of injection when viewed in a horizontal plane, and the spark plug electrodes are positioned substantially on said radius less than half way from the point of injection to the center of the combustion space.

JAY B. MALIN.
WILLIAM N. FENNEY.